Sept. 27, 1927.  R. H. BUTTERS ET AL  1,643,485
TIRE LOCK
Filed July 22, 1924   2 Sheets-Sheet 1
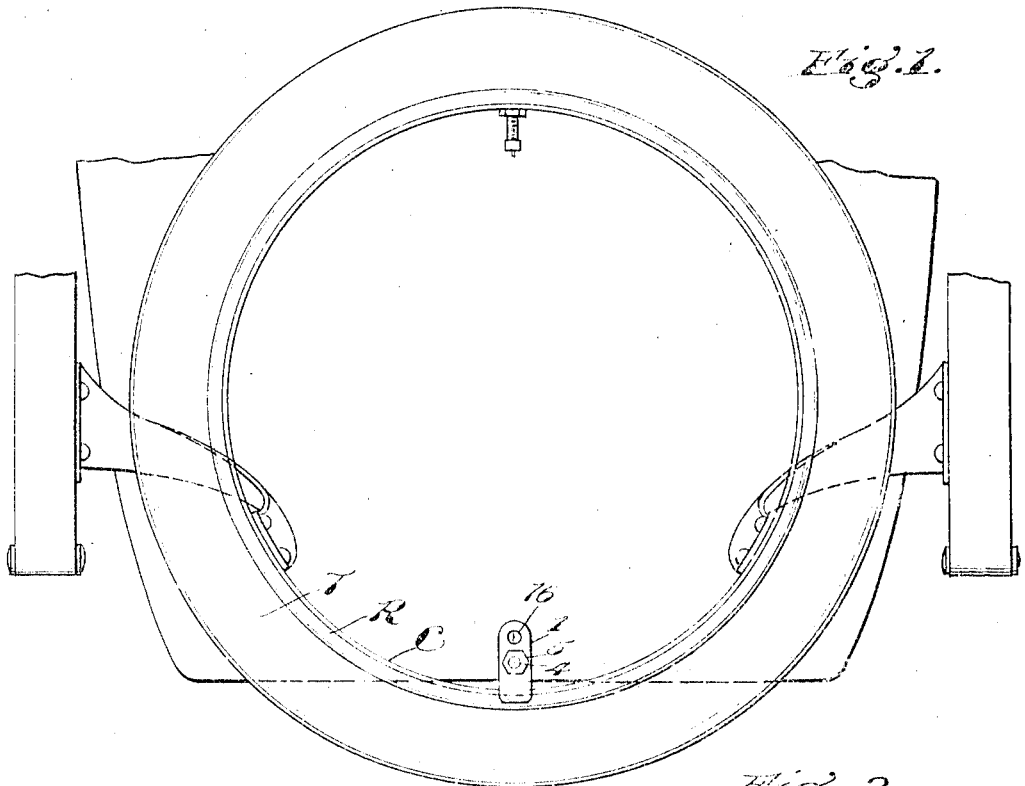
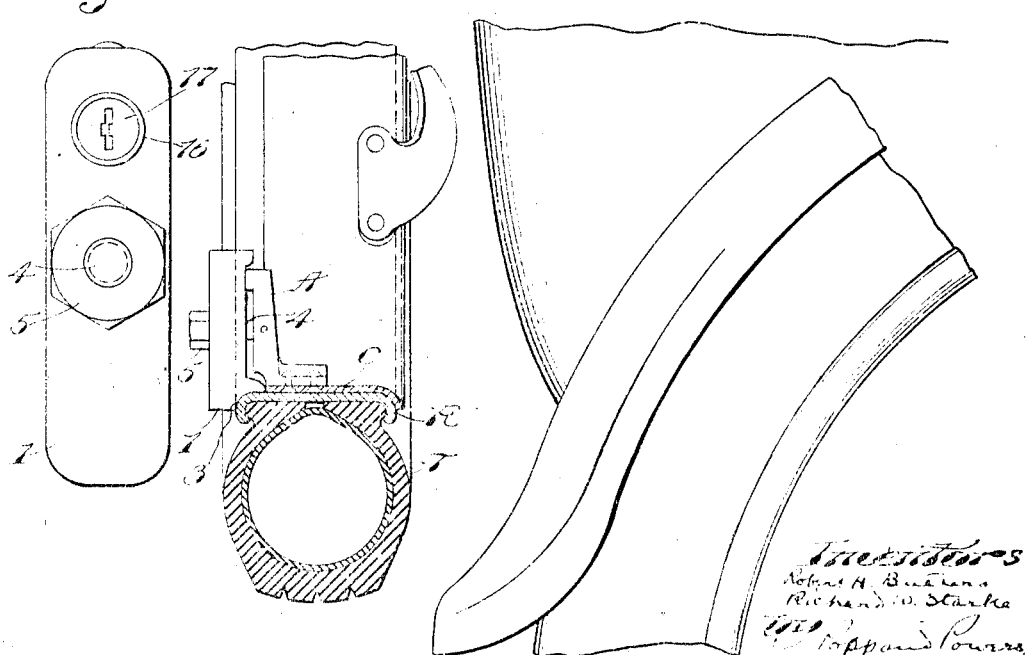

Sept. 27, 1927.                R. H. BUTTERS ET AL                 1,643,485
                                    TIRE LOCK
                               Filed July 22, 1924              2 Sheets-Sheet 2
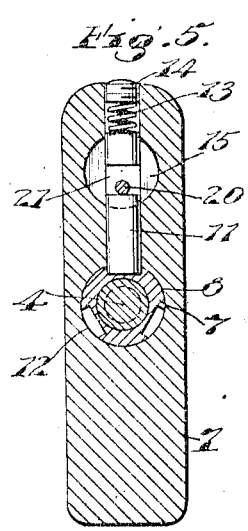
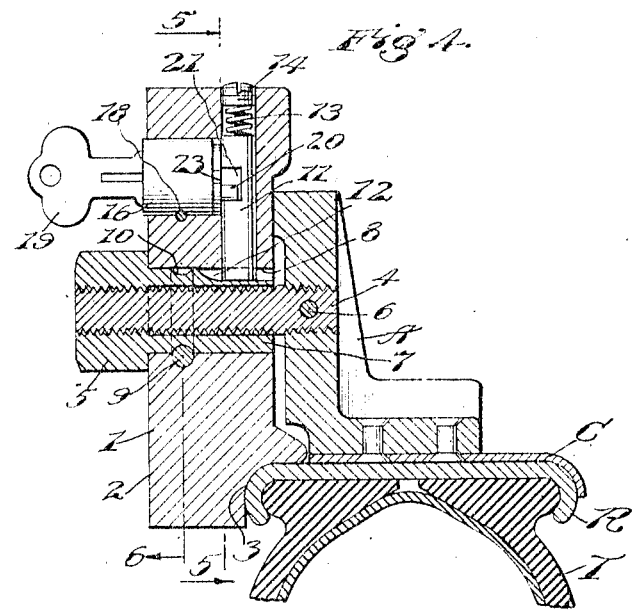
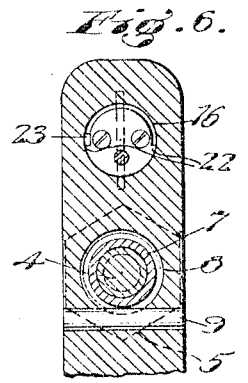
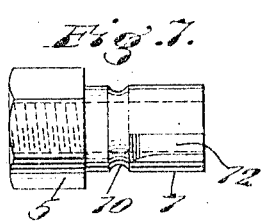
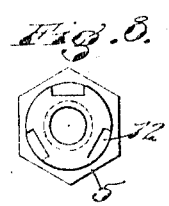
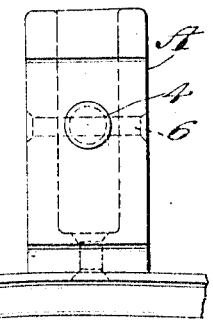
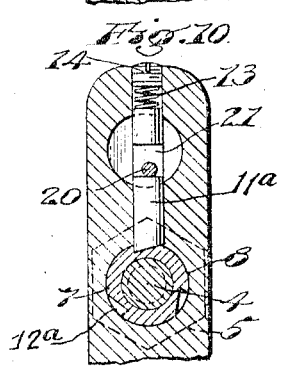
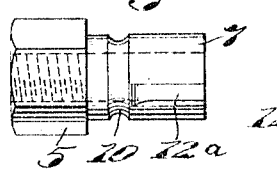
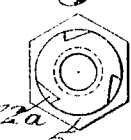
Inventors
Robert H. Butters
Richard W. Starke Patented Sept. 27, 1927.

1,643,485

UNITED STATES PATENT OFFICE.

ROBERT H. BUTTERS AND RICHARD W. STARKE, OF ATLANTA, GEORGIA, ASSIGNORS TO BUTTERS MANUFACTURING COMPANY, OF ATLANTA, GEORGIA, A CORPORATION OF GEORGIA.

TIRE LOCK.

Application filed July 22, 1924. Serial No. 727,469.

This invention relates to improvements in automobile tire locks and proposes a device for cooperation as a clamp element with a companion clamp element of which the tire carrier forms a part, the co-operating clamp elements engaging the rim upon which the tire is mounted.

Heretofore such co-operating rim engaging clamp elements have been connected by a simple bolt and nut fastening which affords virtually no protection against the theft of a tire. As a measure of precaution the co-operating clamp elements have sometimes been additionally secured by a pad-lock, the bail or shackle of which has been passed through alining openings or through an opening in the bolt element of the connecting fastening for the clamp elements, but while the provision of a pad-lock has increased the labor attending the theft of a tire it has not been effective as a measure of protection because of the relative ease with which the bail or shackle of the pad-lock can be cut or sawed or twisted from the body of the lock.

The principal objects of the present invention are to overcome the above noted objection to the use of co-operating rim engaging clamp elements employed to secure a spare tire to its carrier, to provide for this purpose a clamp element with which is incorporated in unitary fashion one of the elements of the securing nut and bolt connection and a locking means for such securing element, and to secure the advantages of simplicity and economy of construction and facility of use.

The invention consists generally of various novel features of structure and combination characterizing the removable rim engaging clamp element and the relation of such element to the companion stationary element with which it co-operates.

In the accompanying drawings:

Figure 1 is an elevation showing the relation of the improved tire lock to a spare tire and the tire carrier, the view being taken at the rear of the automobile.

Figure 2 is an elevation of the same, the view being taken from the side of the automobile and the spare tire and its carrier being shown in section.

Figure 3 is an elevation of the tire lock per se.

Figure 4 is a central longitudinal section of the same in co-operating relation with the stationary rim engaging clamping element.

Figures 5 and 6 are vertical sectional views on the lines 5—5 and 6—6, respectively.

Figure 7 is a detail side elevation of one of the co-operating securing elements incorporated with the removable clamping elements.

Figure 8 is an end view of the same.

Figure 9 is an elevation of the stationary clamping element.

Figure 10 is a sectional view on the same plane as Figure 5, but showing a modified construction.

Figure 11 is a side elevation of the securing element incorporated in the modified construction.

Figure 12 is an end elevation thereof.

Referring to Figures 1 to 9:

Figure 1 shows the spare tire T and its rim R fitted upon an annular tire carrier C. The inner edge of the tire carrier is outturned as at $c$ along a cross sectional curve which conforms to the flange of the rim, the out-turned portion $c$ serving as a flange or shoulder to limit the inward movement of the rim relatively to the tire carrier. A lug A projects radially inward from the tire carrier and is suitably fixed thereto. The lug A and tire carrier C constitute a stationary clamping element for co-operation in securing the spare tire with a removable rim engaging clamping element which is fastened to the stationary element by a nut and bolt connection. According to the present invention the removable clamping element, indicated generally at 1, has incorporated with it one of the elements of the securing connection and a lock for such securing element. The clamping element 1 consists of a body 2 which is held against the lug A and which at its outer end and at the inner side thereof is formed with a recess 3 curved in conformity to the flange of the rim and engaging the rim at the side opposite to that engaged by the flange $c$ of the tire carrier. The bolt of the securing connection is shown at 4 and the co-operating nut is shown at 5. In the construction preferred the bolt 4 is carried by the lug A and the nut 5 is carried by the body 2. The bolt 4 is secured to the lug A by a pin 6 or otherwise suitably and projects rearward from said lug, using the term "rearward" to indicate the direction from front to rear of the automobile. The nut 5 is provided with a reduced extension 7 which fits rotatably in an opening 8 extending between the transverse faces of the block 2, using the term "transverse" to indicate a direction at right angles to the direction of the axis of the bolt 4. The nut 5 is held against axial displacement relatively to the body 2 by a transverse pin 9 fitted in the body 2 and engaging as a key in an annular groove 10 formed in the extension 7.

The nut 5 is threaded upon the bolt 4 so as to draw the block 2 against the lug A and is held against rotation by a lock bolt 11, the inner end of which is engageable with any one of a series of recesses 12 provided along the circumference of the extension 7, the recesses 12 being preferably in the form of longitudinal grooves. The lock bolt 11 is fitted slidably in an opening in the block 2 and is preferably movable along an axis which forms a prolongation of a radius of the extension 7, whereby its inner end may be projected into the opening 8 for engagement in any one of the recesses 12 or may be withdrawn from said opening. The bolt 11, which is preferably arranged above the extension 7, is projected by a spring 13 which engages said bolt at its upper end and reacts against the wall at the upper end of the opening in which the bolt 11 is mounted, such wall being preferably constituted by a permanently secured plug 14.

Suitable lock mechanism is provided for controlling the position of the bolt 11. This mechanism is preferably of the type which includes a series of radially arranged and movable spring pressed pins operative to connect or disconnect a stationary cylindrical shell and a rotatable barrel enclosed therein, a paracentric key being employed to move the pins into the shell and turn the barrel. The lock mechanism is fitted in an opening 15 which extends between the bolt 11 and the rear face of the block 2 and is sufficiently indicated by the showing of the stationary cylindrical shell 16 and the enclosed rotatable barrel 17.

The shell 16 is fixed against turning and axial movement as by a transverse pin 18 fitted in the block 2 and engaging in a transverse groove formed in the under face of the shell 16. The barrel 17 is turned by the key 19 and is provided at its inner end with a projecting eccentric pin 20 which works in a recess 21 formed in the bolt 11 and engages the upper wall of said recess as a shoulder in the operation of retracting the bolt. The turning movement of the barrel is limited to a half-revolution as by diametrically opposite shoulders 22 provided at the inner end of the barrel for engagement with a lug 23 projecting from the shell 16.

In use, the spare tire is fitted on the tire carrier in the usual manner and the removable clamping element is then secured to the stationary clamping element A, this being accomplished by holding the removable clamping element in vertical position opposed to the stationary element and with its recess 3 facing the adjacent flange of the rim and passing the nut 5 over the bolt 4 until the end of the bolt abuts the threaded portion of the nut, at which time, the bolt 11 being retracted, the nut is turned to draw the body 2 against the clamping element A and cause the shoulder provided by the recess 3 to engage the adjacent flange of the rim. When the nut 5 has been turned to the extent permissible and the engagement of the block 2 with the tire carrier has been thereby fully established the barrel 17 is turned by the key 19 so as to permit the projection of the bolt 11 by the spring 13, the inner end of the bolt at such time engaging in the adjacent groove 12 and holding the nut 5 against turning movement. The body 2 as drawn by the nut 5 to operative position against the lug A is positively held against turning movement upon the bolt 4. This may be accomplished in different ways but preferably, and as shown, the body 2 is provided at the upper side of the clearance 3 with a transverse projecting lug 24 which bears upon the inner circumferential face of the rim and has its ends on a radius taken from the axial center of the bolt 4 sufficiently long to develop an arc which will cut the arc of the rim subtended by said lug. In removing the spare tire the operations above described are reversed, that is to say by the key 19 the barrel 17 is turned in the direction required to retract the bolt 11. When said bolt has been retracted the nut 5 is backed off from the bolt 4 and the block 2 thereby removed.

Referring to Figures 10 to 12:

This construction differs from the construction above described only in that the locking bolt, here designated 11ª, and the recesses, here designated 12ª, in the extension 7 are fashioned for engagement in the manner of a pawl and ratchet. In this case, in fitting the removable clamping element to the lug A, the locking bolt is not required to be held retracted but rides over the inclined faces of the recesses 12ª and by engagement with the abrupt faces of said recesses prevents backward turning movement of the nut 5.

Having fully described our invention, we claim:

1. In a spare tire lock, the combination with a rim engaging tire carrier and a lug mounted thereon, said tire carrier and lug constituting a stationary clamp element, of a removable co-operating clamp element comprising a rim engaging body, a part carried by and rotatable relatively to said body for co-operation with a companion fastening part secured to said lug and operative to draw said body against said lug and into engagement with the rim of the tire, and lock mechanism carried by said body for holding said fastening part against rotation relatively to said body.

2. In a spare tire lock, the combination with a rim engaging tire carrier and a lug mounted thereon, said tire carrier and lug constituting a stationary clamp element, of a removable co-operating clamp element comprising a rim engaging body, a nut rotatably fitted in said body for co-operation with a threaded stem projecting from said lug to draw said body against said lug and into engagement with the rim of the tire, said nut having an axial extension within said body and said extension having circumferential recesses, a bolt mounted in said body and engageable in any one of said recesses to hold said nut against rotation, and lock mechanism operative to retract said bolt.

3. A spare tire lock comprising a rim engaging body having an opening, a threaded fastening part rotatably fitted in said opening and having circumferential recesses, a bolt mounted in said body and engageable in any one of said recesses to hold said part against rotation, and lock mechanism operative to retract said bolt.

4. A spare tire lock comprising a rim engaging body having an opening, a nut rotatably fitted in said opening and having circumferential recesses, a bolt mounted in said body and engageable in any one of said recesses to hold said nut against rotation, and lock mechanism operative to retract said bolt.

5. In a spare tire lock, the combination with a rim engaging tire carrier and a lug mounted thereon, said tire carrier and lug constituting a stationary clamp element, of a removable co-operating clamp element comprising a rim engaging body, a part rotatable relatively to said body for co-operation with a companion fastening part secured to said lug and operative to draw said body against said lug and into engagement with the rim of the tire, and lock mechanism mounted within said body for holding said fastening part against rotation relatively to said body.

6. A spare tire lock comprising a rim engaging body having an opening, a threaded fastening part rotatably fitted in said opening, said body and fastening part being co-operating companions, one of said companion parts having circumferentially arranged recesses, a bolt mounted in the other companion part and engageable in any one of said recesses to hold said parts against relative rotation and lock mechanism mounted in the part which carries said bolt and operative to retract said bolt.

In testimony whereof we affix our signatures.

ROBERT H. BUTTERS.
RICHARD W. STARKE.